United States Patent [19]

Kojima et al.

[11] Patent Number: 4,756,995
[45] Date of Patent: Jul. 12, 1988

[54] DIRECT REVERSAL SILVER HALIDE PHOTOGRAPHIC LIGHT-SENSITIVE MATERIAL

[75] Inventors: Tetsuro Kojima; Nobuaki Inoue; Tadashi Ikeda, all of Kanagawa, Japan

[73] Assignee: Fuji Photo Film Co., Ltd., Kanagawa, Japan

[21] Appl. No.: 800,359

[22] Filed: Nov. 21, 1985

Related U.S. Application Data

[63] Continuation-in-part of Ser. No. 581,751, Feb. 21, 1984, abandoned.

[30] Foreign Application Priority Data

Feb. 21, 1983 [JP] Japan .................................. 58-27320

[51] Int. Cl.$^4$ .......................... G03C 1/485; G03C 5/24
[52] U.S. Cl. ...................................... 430/412; 430/597; 430/594
[58] Field of Search ............... 430/597, 580, 606, 411, 430/412, 594, 522

[56] References Cited

FOREIGN PATENT DOCUMENTS 52-20822  2/1977  Japan .
1512040  11/1975 United Kingdom .
1434612  5/1976  United Kingdom .
1474351  5/1977  United Kingdom .
2032636  5/1980  United Kingdom .

Primary Examiner—Won H. Louie
Attorney, Agent, or Firm—Sughrue, Mion, Zinn, Macpeak and Seas

[57] ABSTRACT

A direct reversal silver halide photographic light-sensitive material is disclosed. The material is comprised of a support having thereon a silver halide emulsion layer having silver halide grains, the surface of which is preliminarily fogged, rhodium as a desensitizer, and a dye having an absorption maximum within the range of from 470 to 520 nm. The dye is represented by the general formula (I):

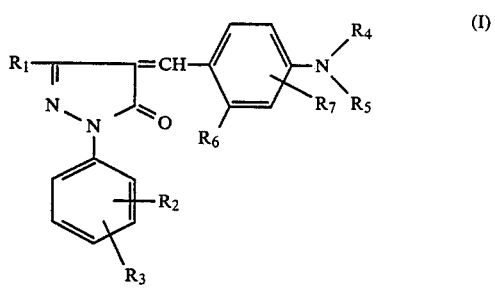

The substituents within general formula (I) are defined in the specification. The material has improved safety with respect to visible safe light and does not suffer color stain after photographic development processing. Further, the dye is stable in a solution state during processing.

17 Claims, No Drawings

DIRECT REVERSAL SILVER HALIDE PHOTOGRAPHIC LIGHT-SENSITIVE MATERIAL

This is a continuation-in-part of application Ser. No. 581,751, filed Feb. 21, 1984, now abandoned.

FIELD OF THE INVENTION

This invention relates to a direct reversal silver halide photographic light-sensitive material and, more particularly, to a direct reversal silver halide photographic light-sensitive material capable of being handled under visible light rays (visible light rays of mainly 450 nm or more in wavelength).

BACKGROUND OF THE INVENTION

When a silver halide light-sensitive material is exposed to lights containing light rays to which the light-sensitive material responds and then developed, the light-struck portions acquire black density which increases as the exposure amount increases to reach its maximal value. However, as the exposure amount is further increased, the black density again decreases to finally form a positive image. This phenomenon is generally called solarization. The same reversal phenomenon takes place with silver halide having been optically or chemically fogged in the course of the steps of preparing a silver halide emulsion containing it. The direct reversal silver halide photographic emulsion used in this specification means an emulsion which has been optically or chemically fogged so as to provide a positive image after ordinary exposure to light and ordinary development.

These types of direct reversal silver halide photographic light-sensitive materials are being used for copying various photographs. In photographic plate-making processes, they are often used, in a step called "reversing", for printing an original halftone dot image positive to positive or negative to negative. Photographic light-sensitive materials to be used in this reversing step must be handled under safe light. Various photographic light-sensitive materials capable of being handled under orthochromatic and panchromatic safe lights are known. Under such safe light, however, workability is poor, and the plate-making step is costly. Therefore, in recent years photographic light-sensitive materials usable under a visible safe light (safe light emitting light rays of mainly 450 nm or longer in wavelength) have been developed (hereinafter referred to as photographic light-sensitive materials for a bright room).

With direct reversal silver halide photographic light-sensitive materials, however, techniques for converting them to the type usable in a bright room have not yet been established. Thus, insufficient resistance to a visible safe light has often caused undesirable phenomena in plate-making processes such as reduction of maximum density, undesirable change in halftone dot area, etc.

That is, in order to make photographic light-sensitive materials handlable in a bright room, it is possible to add a filter dye to an emulsion layer of light-sensitive material or to a hydrophilic colloid layer provided on or above the emulsion layer. However, conventionally proposed filter dyes (for example, oxonol dyes as described in British Pat. No. 506,385, U.S. Pat. Nos. 3,247,127, 2,533,472, 3,379,533, British Pat. Nos. 1,278,621, etc., styryl dyes as described in U.S. Pat. No. 2,298,733, merocyanine dyes as described in U.S. Pat. No. 2,493,747, cyanine dyes as described in U.S. Pat. No. 2,843,486, arylidene dyes as described in British Pat. Nos. 584,609, 900,094, French Pat. No. 1,350,311, U.S. Pat. No. 3,540,887, Japanese Patent Application (OPI) No. 40625/75, etc., and the like) have disadvantages. The term "OPI" as used herein refers to a "published unexamined Japanese patent application". For example, some fail to impart sufficient visible safe light properties to direct reversal silver halide photographic light-sensitive materials, some cause an extreme reduction in intrinsic sensitivity, some cause serious residue of color (residue of the dye in light-sensitive materials after photographic processing), and some decompose during production or storage.

SUMMARY OF THE INVENTION

An object of the present invention is to obtain a direct reversal photographic light-sensitive material having improved safety to visible safe light (safe light emitting mainly light rays of 450 nm or longer in wavelength).

Another object of the present invention is to obtain a direct reversal silver halide photographic light-sensitive material which does not suffer color stain after photographic processing.

A further object of the present invention is to provide a direct reversal silver halide photographic light-sensitive material containing in a hydrophilic layer a dye stable in a solution state during processing.

An additional object of the present invention is to provide a direct reversal silver halide photographic light-sensitive material having both improved safe light safety and a low reduction in gamma.

As a result of various investigations to attain these objects, the inventors have found that specific types of arylidene dyes are particularly effective for attaining the objects of the present invention when used in combination with rhodium salt.

DETAILED DESCRIPTION OF THE INVENTION

Japanese Patent Application (OPI) No. 20822/77 describes a direct reversal silver halide photographic light-sensitive material containing an arylidene dye having the following general formula:

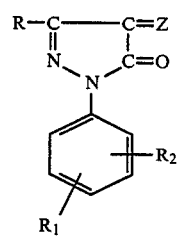

wherein R represents a hydrogen atom, a lower alkyl group, an amino group, a carboxyl group, an alkoxycarbonyl group, a hydroxy group, an alkoxy group or an aryl group; $R_1$ and $R_2$ each represents a hydrogen atom, a halogen atom, a lower alkyl group, an alkoxy group, a hydroxy group, a carboxyl group or a sulfonic acid group; and Z represents

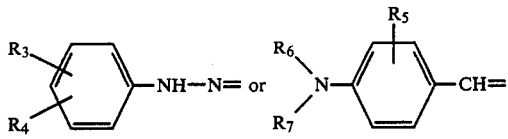

(wherein $R_3$, $R_4$ and $R_5$ each represents a hydrogen atom, a halogen atom, a lower alkyl group, an alkoxy group, a carboxyl group or a sulfonic acid group, and $R_6$ and $R_7$ each represents a hydrogen atom, a lower alkyl group or a substituted alkyl group), provided that at least one of $R_1$, $R_2$, $R_3$, $R_3$ and $R_5$ represents a sulfonic acid group.

In the invention disclosed in the above published specification, however, the dyes are used for reducing contrast of direct reversal silver halide light-sensitive materials for use in copying X-ray photographs. Therefore, the two inventions are completely different with respect to their objects. In addition, all dyes specifically disclosed in the published specification have problems with stability and removability, and are therefore not effective with respect to obtaining the objects of the present invention.

The above-described objects of the present invention can be attained by a direct reversal silver halide photographic light-sensitive material containing, in at least one hydrophilic colloid layer provided on a support, at least one dye represented by the following general formula (I), the dye having an absorption maximum in the range of from 470 to 520 nm:

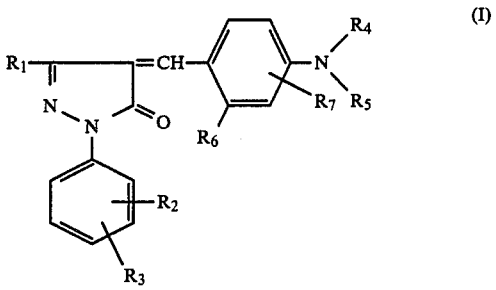

wherein $R_1$ represents a substituted or unsubstituted alkyl group containing 1 to 6 carbon atoms (for example, a methyl group, an ethyl group, a n-propyl group, a n-butyl group, a n-hexyl group, an isopropyl group, a carboxymethyl group, a hydroxyethyl group, etc.) or a substituted or unsubstituted alkoxy group containing 1 to 6 carbon atoms (for example, a methoxy group, an ethoxy group, a n-butoxy group, a methoxyethoxy group, a hydroxyethoxy group or the like); $R_2$ and $R_3$ each represents a hydrogen atom, a halogen atom (for example, a chlorine atom, a bromine atom, etc.), a substituted or unsubstituted alkyl group containing 1 to 6 carbon atoms (for example, a methyl group, an ethyl group, a n-propyl group, a n-butyl group, a n-hexyl group, a hydroxyethyl group, etc.), a substituted or unsubstituted alkoxy group containing 1 to 6 carbon atoms (for example, a methoxy group, an ethoxy group, a n-butoxy group, a methoxyethoxy group, a hydroxyethoxy group, etc.), a hydroxy group, a carboxyl group or its salt, or a sulfonic acid group or its salt, with at least one of $R_2$ and $R_3$ representing a sulfonic acid group or its salt; $R_4$ and $R_5$ each represents a substituted or unsubstituted alkyl group containing 1 to 6 carbon atoms (for example, a methyl group, an ethyl group, a n-propyl group, a sulfoethyl group, a methanesulfonamidoethyl group, a carboxymethyl group, a hydroxyethyl group, a carboxypropyl group, an ethoxycarbonylmethyl group, etc.); $R_6$ represents a substituted or unsubstituted alkyl group containing 1 to 6 carbon atoms (for example, a methyl group, an ethyl group, a n-propyl group, a t-butyl group, a hydroxyethyl group, etc.), or a substituted or unsubstituted alkoxy group containing 1 to 6 carbon atoms (for example, a methoxy group, an ethoxy group, a n-butoxy group, a hydroxyethoxy group, etc.); and $R_7$ represents a hydrogen atom, a halogen atom (for example, a chlorine atom, a bromine atom, etc.), a substituted or unsubstituted alkyl group containing 1 to 6 carbon atoms (for example, a methyl group, an ethyl group, a n-propyl group, a hydroxyethyl group, etc.) or a substituted or unsubstituted alkoxy group containing 1 to 6 carbon atoms (for example, a methoxy group, an ethoxy group, a hydroxyethoxy group, a n-butoxy group, etc.).

In the formula, $R_1$ preferably represents a substituted or unsubstituted alkyl group containing 1 to 6 carbon atoms; $R_2$ and $R_3$ each represents preferably a hydrogen atom, a carboxyl group or its salt, or a sulfonic acid group or its salt, with at least one of $R_2$ and $R_3$ representing a sulfonic acid group or its salt; $R_4$ and $R_5$ each preferably represents a substituted or unsubstituted alkyl group containing 1 to 6 carbon atoms; $R_6$ preferably represents a substituted or unsubstituted alkyl or alkoxy group containing 1 to 6 carbon atoms; and $R_7$ preferably represents a hydrogen atom.

Particularly preferably, $R_1$ in the formula represents a substituted or unsubstituted alkyl group containing 1 to 4 carbon atoms (for example, a methyl group, an ethyl group, a t-butyl group, etc.); $R_2$ represents a hydrogen atom; $R_3$ represents a sulfonic acid group or its salt; $R_4$ and $R_5$ each represents a substituted or unsubstituted alkyl group containing 1 to 6 carbon atoms (at least one of $R_4$ and $R_5$ particularly preferably being a substituent selected from among a sulfoethyl group, a hydroxyethyl group, a carboxymethyl group, a methanesulfonamidoethyl group, and a carboxypropyl group); $R_6$ represents a substituted or unsubstituted alkyl group containing 1 to 4 carbon atoms (for example, a methyl group, an ethyl group, a propyl group, etc.) or a substituted or unsubstituted alkoxy group containing 1 to 4 carbon atoms (for example, a methoxy group, an ethoxy group, etc.); and $R_7$ represents a hydrogen atom.

The compounds to be used in the present invention can be synthesized according to the process described in Japanese Patent Application (OPI) No. 3623/76, etc. That is, they can be synthesized by condensing an aldehyde represented by the following general formula (II) with a pyrazolone derivative represented by the following general formula (III):

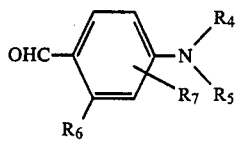
(II)

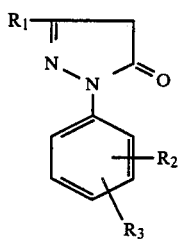
(III)

wherein $R_1$, $R_2$, $R_3$, $R_4$, $R_5$, $R_6$ and $R_7$ are those substituents which have been defined hereinbefore.

The condensation reaction is advantageously conducted using a solvent capable of dissolving the starting materials. Suitable solvents include alcohols (e.g., methanol, ethanol, isopropanol, etc.), acetonitrile, ethylene glycol monoalkyl ethers (e.g., ethylene glycol monomethyl ether, etc.), amides (e.g., acetamide, dimethylformamide, etc.), ethers (e.g., dioxane, etc.), dimethyl sulfoxide, and chloroform. These may be used alone or in combination. The reaction is preferably conducted at room temperature to the boiling point of a solvent used, with temperatures of 50° to 80° C. being particularly preferable. In order to accelerate the reaction, addition of an acid or a base, such as pyridine, piperidine, diethylamine, triethylamine, ammonia gas, potassium acetate, ammonium acetate, acetic acid, or the like is advantageous. The reaction time is usually about 10 minutes to about 5 hours. As to the molar ratio of the aldehyde compound represented by the general formula (II) to the pyrazolone derivative represented by the general formula (III), which are the reactants, about 1 to about 3 mols of the former is preferably used per mol of the latter.

Specific examples of the compound used in the present invention are represented by the general formula (I) are illustrated below which, however, do not limit the compounds of the present invention in any way. (Illustrative compound)

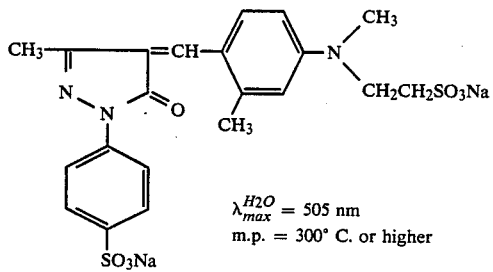
(1)

$\lambda_{max}^{H2O} = 505$ nm
m.p. = 300° C. or higher

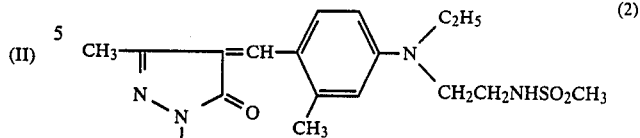
(2)

$\lambda_{max}^{H2O} = 503$ nm
m.p. = 217~218° C.

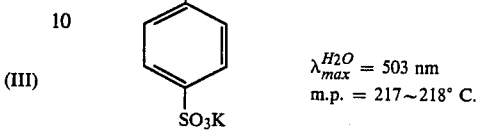
(3)

$\lambda_{max}^{H2O} = 508$ nm
m.p. = 300° C. or higher

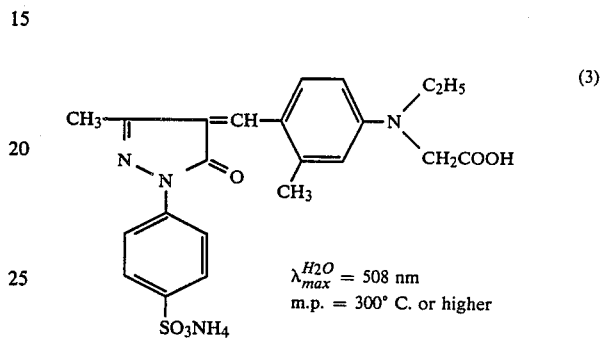
(4)

$\lambda_{max}^{H2O} = 491$ nm
m.p. = 300° C. or higher

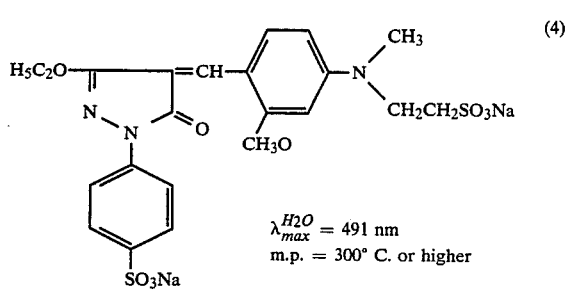
(5)

$\lambda_{max} = 507$ nm
m.p. = 300° C. or higher

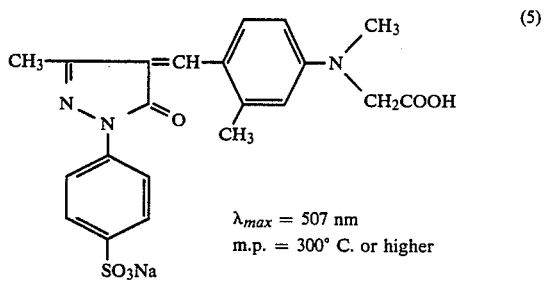
(6)

$\lambda_{max} = 512$ nm
m.p. = 268~270° C.

-continued

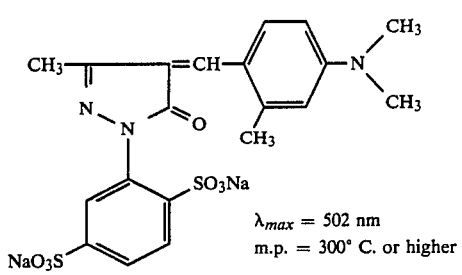

(7)

λ_max = 502 nm
m.p. = 300° C. or higher

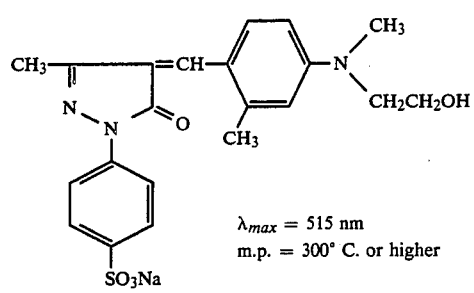

(8)

λ_max = 515 nm
m.p. = 300° C. or higher

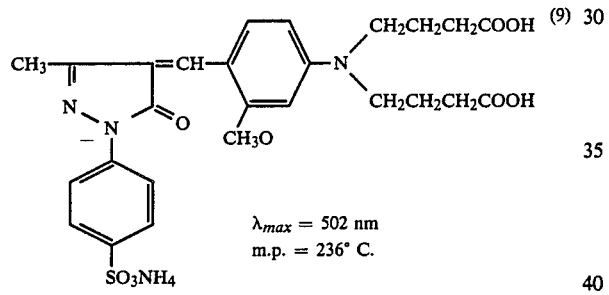

(9)

λ_max = 502 nm
m.p. = 236° C.

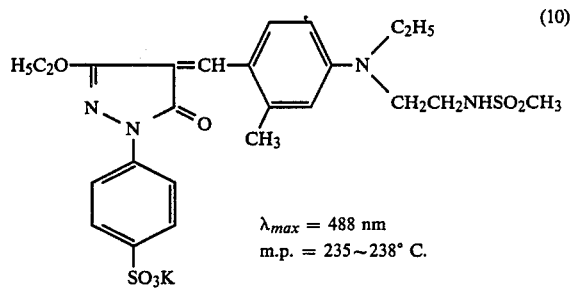

(10)

λ_max = 488 nm
m.p. = 235~238° C.

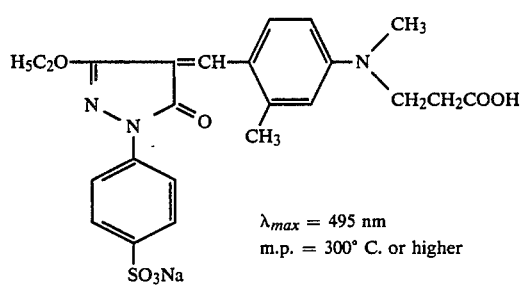

(11)

λ_max = 495 nm
m.p. = 300° C. or higher

-continued

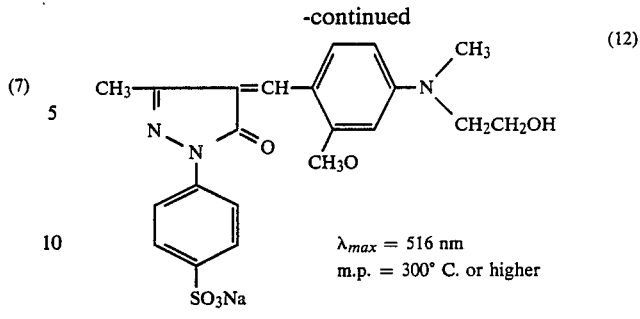

(12)

λ_max = 516 nm
m.p. = 300° C. or higher

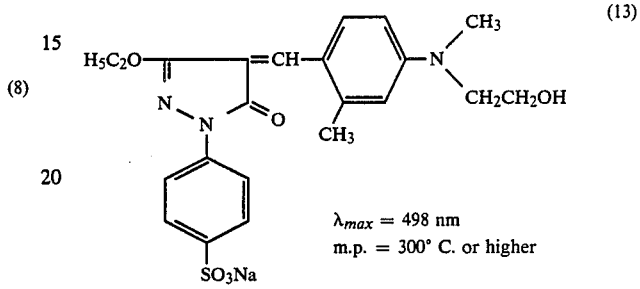

(13)

λ_max = 498 nm
m.p. = 300° C. or higher

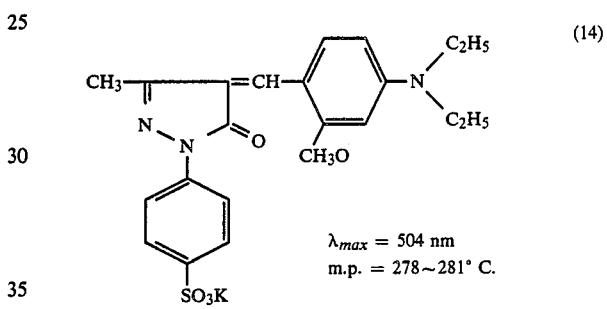

(14)

λ_max = 504 nm
m.p. = 278~281° C.

Specific examples of synthesizing typical compounds to be used in the present invention represented by the general formula (I) are given below. Other compounds can be synthesized in the same manner.

Synthesis Example 1 (Synthesis of illustrative compound (2))

27.2 g of 3-methyl-1-sulfophenyl-5-pyrazolone, 28.4 g of 4-(N-ethyl-N-methanesulfonamidoethylamino)-2-methylbenzaldehyde, and 14.0 ml of triethylamine were dissolved in 330 ml of methyl alcohol, then refluxed under heating for 3 hours. Then, a solution of 9.8 g of potassium acetate in 40 ml of methyl alcohol was added thereto. The mixture was stirred at 50° C. for 1 hour under heating to precipitate crystals in several minutes. The system was further cooled to room temperature and, after stirring for one hour, precipitated crystals were collected by filtration and recrystallized from methyl alcohol to obtain 41.6 g of an orange-yellow dye having an absorption maximum at 503 nm and melting at 217° to 218° C. The thus obtained dye was identified through IR spectrum, NMR spectrum, and elemental analysis.

Synthesis Example 2 (Synthesis of illustrative compound (3))

27.2 g of 3-methyl-1-sulfophenyl-5-pyrazolone, 22.1 g of 4-(N-ethyl-N-carboxymethylamino)-2-methylbenzaldehyde, and 14.0 ml of triethylamine were dissolved in 200 ml of acetonitrile and, after refluxing for 3 hours under heating, 5.7 ml of acetic acid was added thereto, followed by refluxing for another 3 hours while heating. Subsequently, 7.7 g of ammonium acetate was added thereto and, after stirring at 60° C. for 1 hour under heating, crystals were precipitated. The system was further cooled to room temperature, and precipitated crystals were collected by filtration. Recrystallization of the crystals from 1 liter of acetonitrile gave 10.2 g of an orange-yellow dye having an absorption maximum at 508 nm. The thus obtained dye was identified through IR spectrum, NMR spectrum, and elemental analysis.

These compounds represented by the foregoing general formula can be added to a constituent of a direct reversal silver halide photographic light-sensitive material in an ordinary manner by dissolving in a suitable solvent such as water, methanol or ethanol. These compounds are preferably added to a protective layer but, if necessary, they may be added to an emulsion layer, an interlayer, etc.

In the photographic light-sensitive material of the present invention, the dye can be introduced into a hydrophilic colloid layer in a conventional manner. That is, it suffices to add a suitable concentration of an aqueous solution of the dye to a hydrophilic colloid aqueous solution and coat the resulting solution on a support or on another layer constituting the photographic light-sensitive material in a known manner.

The dye is added to the hydrophilic colloid aqueous solution in an amount necessary to reduce the sensitivity of the light-sensitive material to light rays of longer than 450 nm to substantially zero and, preferably, the dye is used in an amount of 5 mg to 1 g, particularly preferably 50 mg to 500 mg, per m$^2$ of the support. In addition, the dye is used in an amount of, preferably 3 g to 25 g, particularly preferably 6 g to 15 g, per mol of silver halide.

The direct reversal silver halide emulsion of the present invention having been fogged is a dispersion prepared by dispersing a silver halide such as silver chloride, silver chlorobromide, silver chlorobromoiodide, silver bromide, silver bromoiodide or the like (iodide content therein being preferably 1 mol% or less) in a protective colloid to be described hereinafter. Such emulsions are prepared by various processes, for example, a neutral process, an ammoniacal process, an acidic process, and a process of using a thioether as described in U.S. Pat. No. 3,574,628.

The primitive emulsions to be used in the direct positive silver halide light-sensitive materials of the present invention are classified into two types: One type of emulsion contains silver halide grains having therein nuclei capable of trapping free electrons and having previously fogged surfaces. Such emulsions are characterized in that they themselves directly provide a positive image. Their sensitivity can of course be raised through the technique of spectral sensitization by adding a sensitizing dye and, in addition, sensitivity in the intrinsic absorption region can also be raised. As the free electron-trapping nuclei of this type emulsions, salts of the group VIII metals are preferably used.

The other types of primitive emulsions include those which do not contain free electron-trapping nuclei within silver halide grains and have silver halide grains whose surface has been chemically fogged. These types of emulsions themselves do not provide any direct positive image but, with the aid of an organic desensitizer, they provide a direct positive image.

Examples using the primitive emulsions having electron-trapping nuclei are described in Japanese Patent Publication Nos. 4125/68, 29405/68, U.S. Pat. Nos. 2,401,051, 2,976,149, 3,023,102, British Pat. Nos. 707,704, 1,097,999, French Pat. Nos. 1,520,824, 1,520,817, Belgian Pat. Nos. 713,272, 721,567, and 681,768.

Examples using the primitive emulsions having no electron-trapping nuclei are described in British Pat. Nos. 1,186,717, 1,186,714, 1,186,716, U.S. Pat. Nos. 3,501,306, 3,501,307, 3,501,310, 3,531,288, 1,520,817, etc.

Either type of emulsion described above can be used in the present invention.

The silver halide photographic emulsion to be used in the present invention is previously fogged optically or chemically. Useful chemically fogging agents include hydrazine series derivatives, thiourea dioxide, formalin, amineboran, stannous chloride, etc.

The direct reversal silver halide photographic light-sensitive material according to the present invention contains a rhodium salt as a desensitizer. Examples of rhodium salts which can be used are water-soluble rhodium salts such as rhodium trichloride, potassium hexachlororhodate (III) and ammonium hexachlororhodate (III).

The rhodium salt is added prior to the completion of physical ripening during production of the emulsion. The rhodium salt is added either during or after the formation of silver halide grains. Preferably, the rhodium salt is added during the formation of grains.

When core/shell type grains are used the rhodium salt is added to the core portion of the grains. The rhodium salt is added during formation of the core, i.e., prior to the initiation of shell formation.

The rhodium salt is added to the grains at a temperature of 45° to 65° C., at a pH of 3.0 to 6.5 and at a pAg of 7.5 to 8.0.

The rhodium salt is added in an amount of $10^{-6}$ to $10^{-2}$ of silver halide.

The degree of fogging the direct reversal silver halide emulsion can be varied over a wide range depending upon silver halide composition, grain size, kind and concentration of fogging agent used, pH and pAg of emulsion upon fogging, temperature and time of fogging, etc.

To the silver halide photographic emulsion to be used in the present invention may be added other photographic additives. For example, a desensitizer (e.g.,) (preferably in a content of $10^{-6}$ to $10^{-3}$ mol/mol silver halide), a stabilizer (e.g., a mercapto compound, a tetrazaindene, etc.), a hardener (e.g., a reactive compound such as an aldehyde compound, 2-hydroxy-4,6-dichloro-1,3,5-triazine, etc., an N-methylol compound, a vinylsulfon compound, etc., though not being limitative), a coating aid such as a natural surfactant (e.g., saponin), a nonionic surfactant (e.g., an alkylene oxide type surfactant, a glycidol type surfactant, etc.), an anionic surfactant containing an acidic group such as a carboxylic acid group, a sulfonic acid group, a phosphoric acid group, a sulfuric acid ester group or a phosphoric acid ester group, an amphoteric surfactant (e.g., an aminoacid, an aminosulfonic acid, etc.), and a polyalkylene oxide compound which also functions as a toe-cutting agent in lithographic development may be incorporated in the emulsion.

The photographic emulsion to be used in the present invention may contain a dispersion of water-insoluble or slightly water-soluble synthetic polymer for the purpose of improving dimensional stability. For example, alkyl acrylate or methacrylate, alkoxyalkyl acrylate or methacrylate, acrylamide, methacrylamide, vinyl ester (e.g., vinyl acetate), acrylonitrile, etc. can be used alone or in combination. Specific examples thereof are described in U.S. Pat. Nos. 2,376,005, 2,739,137, 3,411,911, 3,488,708, 3,607,290, 3,635,715, etc.

The dye of general formula (I) to be used in the present invention can be used together with other dyes such as oxonol dyes as described in British Pat. Nos. 506,385, 1,373,026, 1,278,621, U.S. Pat. Nos. 3,247,127, 3,867,149, 2,533,472, 3,379,533, etc., styryl dyes as described in U.S. Pat. Nos. 2,298,733, 4,268,622, etc., merocyanine dyes as described in U.S. Pat. No. 2,493,747, etc., and azo dyes as described in British Pat. No. 575,691.

Emulsions to be used in the present invention contain mainly gelatin as a protective colloid, with inert gelatin being particularly advantageous. Gelatin may be replaced by a photographically inert gelatin derivative (e.g., phthaloylated gelatin), a water-soluble synthetic polymer (e.g., polyvinyl acrylate, polyvinyl alcohol, polyvinyl pyrroidone, etc.), etc.

The novel emulsion of the present invention is coated on any suitable photographic support such as glass, film base (for example, cellulose acetate, cellulose acetate butyrate, polyester (e.g., polyethylene terephthalate, etc.)), or the like.

To the direct positive silver halide photographic light-sensitive material of the present invention may be applied a development processing called "lith type" and a development processing of imparting "ultra contrast" described in Japanese Patent Application (OPI) No. 37732/79, U.S. Pat. No. 4,221,857, etc. "Lith type" development processing means a development processing of using usually a dihydroxybenzene as a developing agent and conducting development in an infectious manner at a low sulfite ion concentration for photographic reproduction of lines or of halftone images by halftone dots.

The present invention will now be described in more detail by referring to the following examples in accordance with the present invention. However, the scope of the invention is not limited to these examples.

EXAMPLE 1

An aqueous solution of KBr and a silver nitrate aqueous solution were simultaneously added under stirring to a gelatin aqueous solution containing $1 \times 10^{-3}$ mole per mole of silver of rhodium trichloride to prepare a silver bromide gelatin emulsion containing silver bromide grains of about $0.2\mu$ in mean grain size. This emulsion was freed of salts by a flocculation method using a polyvalent anionic polymer and, after adjusting the pH, 25 mg of hydrazine was added thereto per mol of silver, followed by heating to cause fogging. The resulting direct reversal silver bromide emulsion was separated into several equal portions. A hardener and a surfactant were added to each portion, followed by coating the resulting solution on a cellulose triacetate film in a silver amount of 3 g/m². A gelatin solution containing a dye give in Table 1 was coated thereon as a protective layer.

Comparative samples were prepared by adding the dyes represented by the following structural formulae A, B, and C in place of the dye in accordance with the present invention.

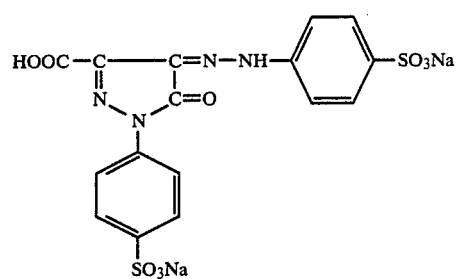

A

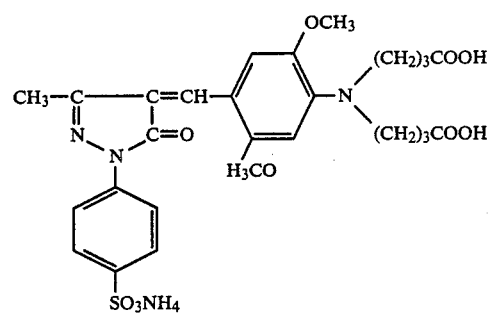

B

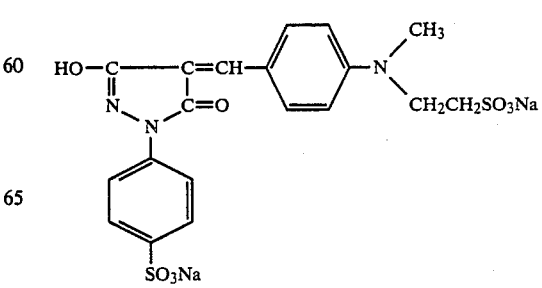

C

TABLE 1

| No. | Illustrative Compound (Added Amount/m²) | | λmax (H₂O) | Reversal Sensitivity (Relative) | Safe Light Properties (Density) | | | | Residual Color |
| --- | --- | --- | --- | --- | --- | --- | --- | --- | --- |
| | | | | | After 0 min | After 5 min | After 10 min | After 20 min | |
| 1 | 2 | (280 mg) | 503 nm | 100 | 5.5 | 5.4 | 3.9 | 1.0 | 0.01 |
| 2 | " | (560 mg) | | 50 | 5.5 | 5.5 | 5.5 | 5.3 | 0.02 |
| 3 | 3 | (280 mg) | 508 nm | 100 | 5.5 | 5.4 | 3.8 | 0.9 | 0.01 |
| 4 | " | (560 mg) | | 50 | 5.5 | 5.5 | 5.5 | 5.2 | 0.02 |
| 5 | 8 | (280 mg) | 515 nm | 100 | 5.5 | 5.4 | 3.7 | 0.8 | 0.02 |
| 6 | 9 | (280 mg) | 502 nm | 100 | 5.5 | 5.4 | 3.8 | 1.0 | 0.01 |
| 7 | 14 | (280 mg) | 504 nm | 100 | 5.5 | 5.3 | 3.6 | 0.8 | 0.02 |
| 8 | A | (100 mg) | 432 nm | 100 | 5.5 | 3.0 | 0.25 | 0.08 | 0.01 |
| 9 | " | (200 mg) | | 50 | 5.5 | 5.3 | 2.9 | 0.37 | 0.01 |
| 10 | B | (280 mg) | 532 nm | 98 | 5.5 | 3.2 | 0.2 | 0.10 | 0.01 |
| 11 | C | (280 mg) | 518 nm | 100 | 5.5 | 5.2 | 3.6 | 0.7 | 0.07 |

Each of the thus obtained samples was exposed through an optical wedge for sensitometry using a mercury lamp as a light source, then developed with the following developing solution.

| | |
| --- | --- |
| Metol (p-methylaminophenol hemisulfate) | 3.1 g |
| Sodium sulfite | 45 g |
| Hydroquinone | 12 g |
| Sodium carbonate | 79 g |
| KBr | 1.9 g |
| H₂O | 1 liter |

Subsequently, they were fixed with an acidic hardening solution, washed with water, and dried. Evaluation on safe light properties was conducted by leaving the samples for varying periods of time shown in Table 1 under a 200-lux light emitted from a fluorescent lamp with UV light rays being cut, developing them in the same manner as described above, and measuring their density. The results thus obtained are shown in Table 1. Additionally, residual color density was evaluated in terms of the absorbance at a maximum absorption wavelength. As is clear from Table 1, samples in accordance with the present invention kept the maximum density after being left for a long time under UV-cut safe light, thus demonstrating high safety to a safe light and remarkably less color stain after photographic processing than that with the comparative compounds. Also, it is clear that samples 8 to 11 cannot be practically used due to their poor safety to safe light and serious color stain after photographic processing.

EXAMPLE 2

As in Example 1, a direct reversal silver bromide emulsion was separated into several equal portions, a hardener and a surfactant were added to each portion, each resulting portion was coated on a cellulose triacetate film in a silver amount of 3 g/m², then a gelatin solution containing a dye of the present invention given in Table 2 or a gelatin solution containing comparative dye A used in Example 1 was coated thereon as a protective layer. The thus coated samples were subjected to the same tests as in Example 1. The results thus obtained are shown in Table 2. As is clear from Table 2, it is seen that the system containing the dye of the present invention showed remarkably improved safe light properties wth respect to sensitivity.

TABLE 2

| No. | Illustrative Compound (Added Amount/m²) | | Reversal Sensitivity (Relative) | Safe Light Properties (Density) | | | |
| --- | --- | --- | --- | --- | --- | --- | --- |
| | | | | After 0 min | After 5 min | After 10 min | After 20 min |
| 1 | A (100) | — | 100 | 5.5 | 3.0 | 0.2 | 0.08 |
| 2 | A (200) | — | 50 | 5.5 | 5.3 | 2.9 | 0.37 |
| 3 | A (140) | 2 (140) | 100 | 5.5 | 5.2 | 4.5 | 4.0 |
| 4 | A (140) | 2 (280) | 50 | 5.5 | 5.5 | 5.2 | 4.9 |
| 5 | A (140) | 3 (140) | 100 | 5.5 | 5.1 | 4.5 | 3.8 |
| 6 | A (140) | 3 (280) | 50 | 5.5 | 5.5 | 5.2 | 4.8 |
| 7 | — | 2 (560) | 100 | 5.5 | 5.5 | 5.5 | 5.3 |
| 8 | — | 3 (560) | 100 | 5.5 | 5.5 | 5.5 | 5.2 |

EXAMPLE 3

200 mg of dye (2), (9) or (14) of the present invention was added to 100 cc of a 6% gelatin aqueous solution, and the resulting solution was left for a long time at 40° C. to measure its density. The measurement was conducted by weighing 1 cc of the sample, diluting 1000 times, and measuring the absorption maximum. The same experiments were conducted using comparative dyes of the following structural formulae D, E and F. The results thus obtained are shown in Table 3. As is clear from Table 3, the dyes of the present invention underwent no change in density, thus showing a high stability in a gelatin aqueous solution.

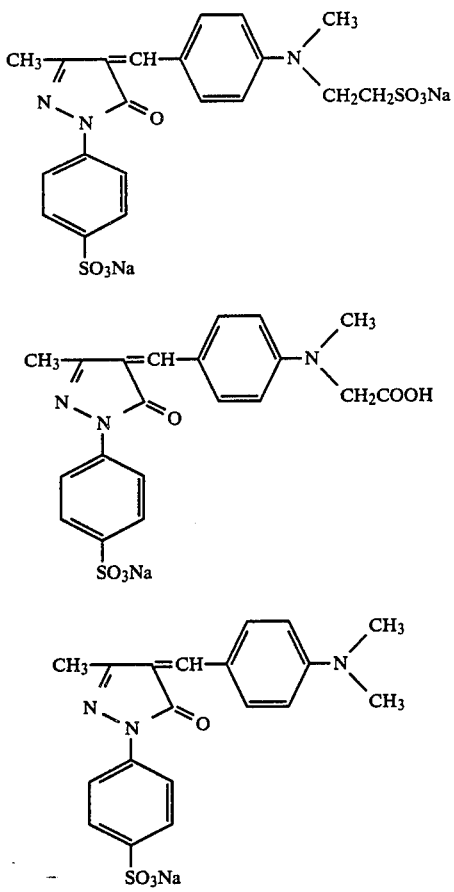

TABLE 3

| No. | Illustrative Compound | Hours Elapsed After Dissolution And Density (40° C.) | | | | | $\lambda$max |
|---|---|---|---|---|---|---|---|
| | | 0 hr. | 1 hr. | 2 hr. | 4 hr. | 8 hr. | |
| 1 | (2)  | 0.606 | 0.606 | 0.605 | 0.604 | 0.604 | 503 nm |
| 2 | (9)  | 0.720 | 0.715 | 0.714 | 0.710 | 0.710 | 502 nm |
| 3 | (14) | 0.880 | 0.875 | 0.875 | 0.870 | 0.850 | 504 nm |
| 4 | D    | 0.640 | 0.600 | 0.580 | 0.550 | 0.510 | 486 nm |
| 5 | E    | 0.640 | 0.620 | 0.590 | 0.562 | 0.520 | 486 nm |
| 6 | F    | 0.590 | 0.585 | 0.580 | 0.550 | 0.510 | 490 nm |

EXAMPLE 4

To a direct positive emulsion prepared by desensitizing with rhodium trichloride in the same manner as in Example 1, each of the dyes shown in Table 4 was added to prepare Samples 101, 102, 103 and 104.

To a direct positive emulsion prepared in the same manner as in Example 1, except that pinakryptol yellow (300 mg/mol-Ag) was used for the desensitization instead of the rhodium salt (rhodium trichloride). The pinakryptol yellow was added at the final stage of formation of the silver halide grains. Each of the dyes shown in Table 5 was added to prepare Samples 105, 106, 107 and 108.

The thus prepared samples were evaluated in terms of reversal sensitivity and safe light properties in the same manner as in Example 1. The results obtained are shown in Tables 4 and 5 below.

In addition, the respective dyes used in these samples were evaluated in terms of properties with the lapse of time after dissolution and density in the same manner as in Example 3. The results are shown in Table 6.

Tables 4 and 5 show that the direct positive emulsions desensitized with rhodium (Table 4) give rise to markedly excellent safe light properties as compared with those obtained when densitization is carried out with pinakryptol yellow (Table 5) (Tables 4 and 5 show that the dyes of the present invention and British exhibit similar properties with respect to sensitivity and safe light properties when used in photographic materials).

Rhodium is compared with pinakryptol yellow since pinakryptol yellow is the most popular and practically used of the known organic desensitizers for auto positive materials (e.g., pinakryptol yellow, quinoxaline, etc.). Pinakryptol yellow is commonly added at the final stage of formation of the silver halide grains.

The results shown in Tables 4 and 5 are significant from a commercial standpoint since a photographic material which is high in sensitivity and is not reduced in Dmax is easy in handling even when exposed in a light room for a long period of time.

Table 6 shows that the dyes used in the present invention exhibit excellent properties due to the presence of the substituents at $R_6$ of general formula (I), i.e., reduction of density with the lapse of time after dissolution is quite low. Specifically, Table 6 shows that the physical properties of the dyes of the present invention (the dyes themselves when not incorporated in a photographic material) are superior to the dyes of British. Table 6 shows that the dyes of the present invention provide superior results when compared with the dyes of British with respect to density change after dissolution. The density change is an important criterion since it shows that when the time required from the addition of the dye to an emulsion to performing coating after preparing the dye solution is prolonged the properties of the resulting materials are hardly changed. This is an important result from an industrial viewpoint since dyes with high stability are desired.

The above results show that when rhodium salt is added in combination with dye of the present invention improved safe light properties and a low reduction in gamma are obtained.

EXAMPLE 5

Emulsions 1 and 2 were prepared as follows. An aqueous solution of KBr and a silver nitrate aqueous solution were simultaneously added under stirring to a gelatin aqueous solution kept at 60° C. over 60 minutes, during which the pAg was kept at 7.6, to prepare a silver bromide emulsion having a mean grain diameter of 0.25$\mu$. 5 minutes after the foregoing components were added together, $1 \times 10^{-3}$ mole per mole of silver of ammonium hexachlororhodate (III) was directly added to the charging vessel in which the grain formation was being performed. Thereafter, this emulsion was processed in the same manner as in Example 1.

Emulsions 3 and 4 were prepared in essentially the same manner as Emulsions 1 and 2, except that instead of adding ammonium hexachlororhodate (III), 100 mg/Ag-mole of 6-ethoxy-1-methyl-2-(3-nitrostyryl)

quinolinium methyl sulfate (Pinakryptol Yellow) was added at the final stage.

In the following tables "British" refers to British Patent Specification No. 1,474,351.

TABLE 4

| Sample No. | Compound | Desensitizer | Amount of Dye Added (mg/m²) | Sensitivity | Safe Light Properties (Dmax) | | | |
|---|---|---|---|---|---|---|---|---|
| | | | | | After 0 min | After 5 min | After 10 min | After 20 min |
| 101 | Compound (2) (Invention) | Rh* | 280 | 100 | 5.5 | 5.4 | 3.9 | 1.0 |
| 102 | Compound (4) (Invention) | Rh* | " | 91 | 5.5 | 5.4 | 4.0 | 1.5 |
| 103 | Dye-1 (British) | Rh* | " | 95 | 5.5 | 5.3 | 3.0 | 0.7 |
| 104 | Dye-18 (British) | Rh* | " | 98 | 5.5 | 5.4 | 4.0 | 1.5 |

*rhodium (added during the formation of grains)

TABLE 5

| Sample No. | Compound | Desensitizer | Amount of Dye Added (mg/m²) | Sensitivity | Safe Light Properties (Dmax) | | | |
|---|---|---|---|---|---|---|---|---|
| | | | | | After 0 min | After 5 min | After 10 min | After 20 min |
| 105 | Compound (2) (Invention) | PY** | 280 | 100 | 5.5 | 3.9 | 1.3 | 0.01 |
| 106 | Compound (4) (Invention) | PY** | " | 93 | 5.5 | 4.1 | 1.6 | 0.02 |
| 107 | Dye-1 (British) | PY** | " | 93 | 5.5 | 4.0 | 1.2 | 0.01 |
| 108 | Dye-18 (British) | PY** | " | 95 | 5.5 | 4.0 | 1.5 | 0.03 |

**pinakryptol yellow (6-ethoxy-1-methyl-2-(3-nitrostyryl)-quinolinium methyl sulfate (added at the final stage)

TABLE 6

| Compound | Hours Elapsed after Dissolution and Density (40° C.) | | | | | |
|---|---|---|---|---|---|---|
| | 0 hr. | 1 hr. | 2 hr. | 4 hr. | 8 hr. | λmax (nm) |
| Compound (2) (Invention) | 0.606 | 0.606 | 0.606 | 0.604 | 0.604 | 503 |
| Compound (4) (Invention) | 0.730 | 0.730 | 0.729 | 0.728 | 0.727 | 491 |
| Dye-1 (British) | 0.640 | 0.600 | 0.580 | 0.550 | 0.510 | 486 |
| Dye-18 (British) | 0.79 | 0.70 | 0.62 | 0.550 | 0.500 | 500 |

The results are shown in the following Table.

TABLE 7

| No. | Illustrative Compound | Desensitizer | Addition Amount of Dye (mg/m²) | Sensitivity | Safe Light Properties (Dmax) | | | |
|---|---|---|---|---|---|---|---|---|
| | | | | | After 0 min | After 5 min | After 10 min | After 20 min |
| 1* | (9) | Rh | 280 | 100 | 5.5 | 5.4 | 5.0 | 2.0 |
| 2* | (10) | " | " | 93 | 5.5 | 5.4 | 4.9 | 2.0 |
| 3** | (9) | PY | " | 105 | 5.5 | 3.8 | 1.0 | 0.01 |
| 4** | (10) | " | " | 95 | 5.5 | 4.0 | 1.5 | 0.05 |

*invention
**comparison
PY: 100 mg/Ag-mole of 6-ethoxy-1-methyl-2-(3-nitrostyryl)quinolinium methyl sulfate (added at the final stage of formation of the grains)
Rh: $1 \times 10^{-3}$ mole/Ag-mole ammonium hexachlororhodate (III) (added during the formation of grains)

Table 7 shows that superior safe light properties (Dmax) are obtained when ammonium hexachlororhodate (III) is used as a desensitizer (present invention) as compared to use of Pinakryptol Yellow as a desensitizer.

While the invention has been described in detail and with reference to specific embodiments thereof, it will be apparent to one skilled in the art that various changes and modifications can be made therein without departing from the spirit and scope thereof.

What is claimed is:

1. A direct reversal silver halide photographic light-sensitive material comprising:
a support having thereon;
a silver halide emulsion layer having silver halide grains, the surface of which is preliminarily fogged;
a dye represented by general formula (I) showing an absorption maximum within the range of from 470 to 520 nm:

-continued

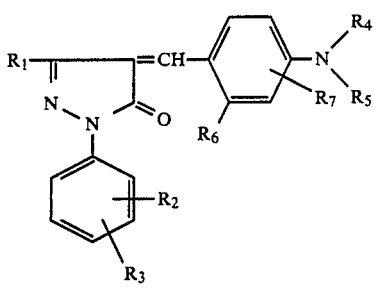

wherein $R_1$ represents a substituted or unsubstituted alkyl group containing 1 to 6 carbon atoms or a substituted or unsubstituted alkoxy group containing 1 to 6 carbon atoms; $R_2$ and $R_3$ each represents a hydrogen atom, a halogen atom, a substituted or unsubstituted alkyl group containing 1 to 6 carbon atoms, a substituted or unsubstituted alkoxy group containing 1 to 6 carbon atoms, a hydroxy group, a carboxyl group or its salt, or a sulfonic acid group or its salt, with at least one of $R_2$ and $R_3$ representing a sulfonic acid group or its salt; $R_4$ and $R_5$ each represents a substituted or unsubstituted alkyl group containing 1 to 6 carbon atoms; $R_6$ represents a substituted or unsubstituted alkyl group containing 1 to 6 carbon atoms or a substituted or unsubstituted alkoxy group containing 1 to 6 carbon atoms; and $R_7$ represents a hydrogen atom, a halogen atom, a substituted or unsubstituted alkyl group containing 1 to 6 carbon atoms or a substituted or unsubstituted alkoxy group containing 1 to 6 carbon atoms, said dye being contained in at least one hydrophilic colloid layer provided on said support; and
rhodium as a desensitizer.

2. A direct reversal silver halide photographic light-sensitive material as claimed in claim 1, wherein $R_1$ is a substituted or unsubstituted alkyl group containing 1 to 6 carbon atoms; $R_2$ and $R_3$ each represents a hydrogen atom, a carboxyl group or its salt, or a sulfonic acid group or its salt, with at least one of $R_2$ and $R_3$ representing a sulfonic acid group or its salt; $R_4$ and $R_5$ each represents a substituted or unsubstituted alkyl group containing 1 to 6 carbon atoms; $R_6$ is a substituted or unsubstituted alkyl or alkoxy group containing 1 to 6 carbon atoms; and $R_7$ is a hydrogen atom.

3. A direct reversal silver halide photographic light-sensitive material as claimed in claim 1, wherein $R_1$ is a substituted or unsubstituted alkyl group containing 1 to 4 carbon atoms; $R_2$ is a hydrogen atom; $R_3$ is a sulfonic acid group or its salt; $R_4$ and $R_5$ each represents a substituted or unsubstituted alkyl group containing 1 to 6 carbon atoms; $R_6$ is a substituted or unsubstituted alkyl group containing 1 to 4 carbon atoms or a substituted or unsubstituted alkoxy group containing 1 to 4 carbon atoms; and $R_7$ is a hydrogen atom.

4. A direct reversal silver halide photographic light-sensitive material as claimed in claim 3, wherein at least one of $R_4$ and $R_5$ represents a substituent selected from the group consisting of a sulfoethyl group, a hydroxyethyl group, a carboxymethyl group, a methanesulfonamidoethyl group, and a carboxypropyl group.

5. A direct reversal silver halide photographic light-sensitive material as claimed in claim 1, wherein the dye is present in an amount in the range of 5 mg to 1 g per square meter of said support.

6. A direct reversal silver halide photographic light-sensitive material as claimed in claim 5, wherein the dye is present in an amount in the range of 50 mg to 500 mg per square meter of said support.

7. A direct reversal silver halide photographic light-sensitive material as claimed in claim 1, wherein the dye is present in an amount in the range of 3 g to 25 g per mol of the silver halide.

8. A direct reversal silver halide photographic light-sensitive material as claimed in claim 7, wherein the dye is present in an amount in the range of 6 g to 15 g per mol of silver halide.

9. A process for forming a direct reversal silver halide image comprising:
imagewise exposing and developing a direct reversal silver halide photographic material, comprising:
a support having thereon;
a silver halide emulsion layer which is preliminarily fogged;
a dye represented by general formula (I) showing an absorption maximum within the range of from 470 to 520 nm:

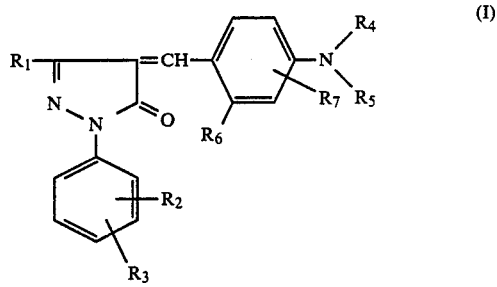

wherein $R_1$ represents a substituted or unsubstituted alkyl group containing 1 to 6 carbon atoms or a substituted or unsubstituted alkoxy group containing 1 to 6 carbon atoms; $R_2$ and $R_3$ each represents a hydrogen atom, a halogen atom, a substituted or unsubstituted alkyl group containing 1 to 6 carbon atoms, a substituted or unsubstituted alkoxy group containing 1 to 6 carbon atoms, a hydroxy group, a carboxyl group or its salt, or a sulfonic acid group or its salt, with at least one of $R_2$ and $R_3$ representing a sulfonic acid group or its salt; $R_4$ and $R_5$ each represents a substituted or unsubstituted alkyl group containing 1 to 6 carbon atoms; $R_6$ represents a substituted or unsubstituted alkyl group containing 1 to 6 carbon atoms or a substituted or unsubstituted alkoxy group containing 1 to 6 carbon atoms; and $R_7$ represents a hydrogen atom, a halogen atom, a substituted or unsubstituted alkyl group containing 1 to 6 carbon atoms or a substituted or unsubstituted alkoxy group containing 1 to 6 carbon atoms, said dye being contained in at least one hydrophilic colloid layer provided on said support; and rhodium as a desensitizer;

wherein said direct reversal silver halide material is used under visible safe light.

10. A process as claimed in claim 9, wherein said direct reversal silver halide photographic material is used under a safe light emitting light rays of 450 nm or longer in wavelength.

11. A direct reversal silver halide photographic light-sensitive material as claimed in claim 1, wherein rhodium is contained in a silver halide emulsion layer.

12. A direct reversal silver halide photographic material as claimed in claim 1, wherein the rhodium salt is added in an amount of $10^{-6}$ to $10^{-2}$ of silver halide.

13. A direct reversal silver halide photographic material as claimed in claim 1, wherein the rhodium salt is a water-soluble rhodium salt.

14. A direct reversal silver halide photographic material as claimed in claim 13, wherein the rhodium salt is selected from the group consisting of rhodium trichloride, potassium hexachlororhodate (III) and ammonium hexacholororhodate (III).

15. A process as claimed in claim 9, wherein the rhodium salt is added in an amount of $10^{-6}$ to $10^{-2}$ of silver halide.

16. A process as claimed in claim 9, wherein the rhodium salt is a water-soluble rhodium salt.

17. A process as claimed in claim 16, wherein the rhodium salt is selected from the group consisting of rhodium trichloride, potassium hexachlororhodate (III) and ammonium hexachlororhodate (III).

* * * * *